Dec. 12, 1950    R. L. HENSON, JR    2,533,249
SEISMIC DETECTOR
Filed Feb. 4, 1947
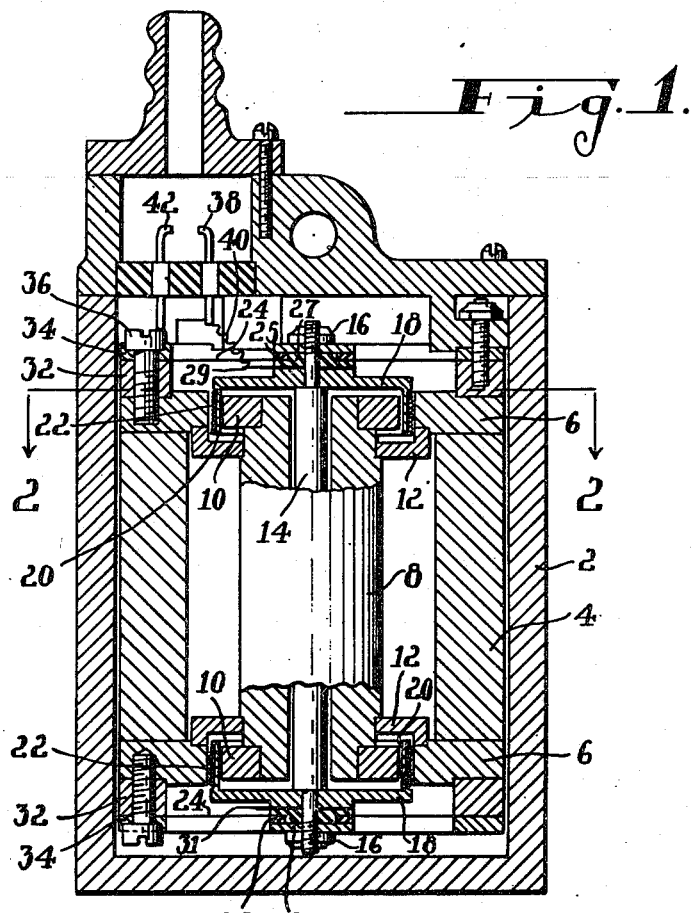
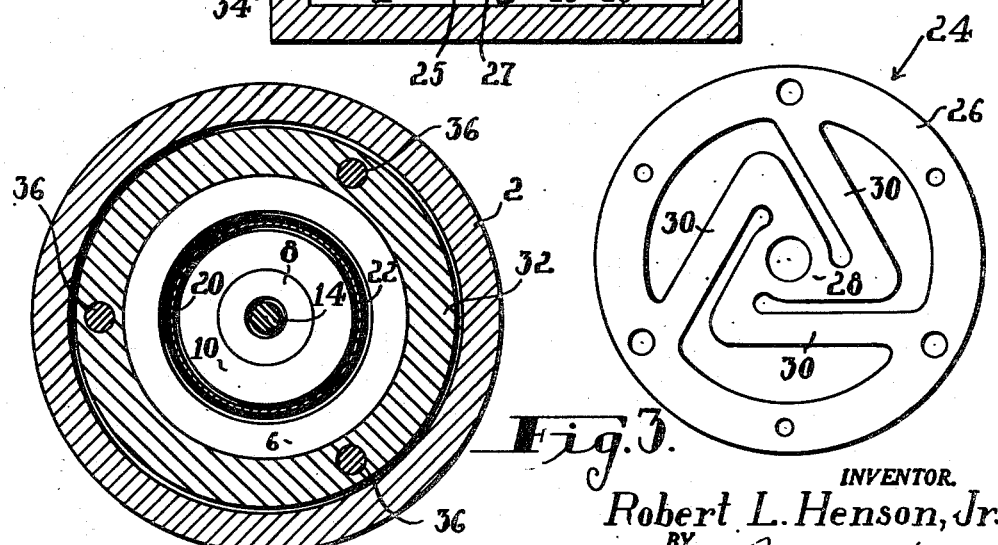
INVENTOR.
Robert L. Henson, Jr.
BY
ATTORNEYS Patented Dec. 12, 1950

2,533,249

UNITED STATES PATENT OFFICE 2,533,249

SEISMIC DETECTOR

Robert L. Henson, Jr., Beaumont, Tex., assignor to Sun Oil Company, Philadelphia, Pa., a corporation of New Jersey Application February 4, 1947, Serial No. 726,252

9 Claims. (Cl. 171—209)

This invention relates to a seismic detector and has particular reference to an improved detector of astatic type which will avoid pick-up of stray magnetic fields.

Detectors such as used in seismic prospecting work are required to be of high sensitivity in view of the fact that they must give useable electrical outputs for extremely minute movements of the earth resulting from seismic waves emanating from a distant explosion. Such high degree of sensitivity is ordinarily accompanied by an equally high tendency toward the pick-up of stray magnetic fields due to power lines or the like giving rise to signals usually in the nature of hum of frequencies in the range of the earth frequencies to which the detector is normally supposed to respond.

In accordance with the present invention there is provided an improved seismic detector of simple construction and of high sensitivity coupled with astatic properties which reduce to a very low level its pick-up of stray magnetic fields.

The accomplishment of this result as well as other objects of the invention particularly relating to details of construction will become apparent from the following description read in conjunction with the accompanying drawing in which:

Figure 1 is a vertical axial section through the improved detector;

Figure 2 is a transverse section taken on the plane indicated at 2—2 in Figure 1; and Figure 3 is a plane elevation of one of the suspension springs for the moving system.

Within a cylindrical housing 2 of non-magnetic material there is located a powerful permanent magnet in the form of a cylinder 4 which may be of Alnico or the like. Associated with the ends of this are disc-shaped steel pole pieces 6. A central steel core 8 has fitted on its end steel rings 10 and the assembly thus provided is secured in concentric relationship with the parts first described by means of spacers 12 of non-magnetic material, for example, aluminum, which have press fits on the core 8, and fit into shallow recesses in the pole pieces 6. The outer pole pieces 6 may be welded to the magnet 4 while the spacer rings are deflected slightly by pressure applied to the pole pieces 6. The arrangement, as will be evident from Figure 1, provides a pair of annular air gaps between the respective members 6 and 10. The magnet 4 having its poles at its ends thus provides a permanent magnetic field extending in an inward radial direction across one of these gaps and in an outward radial direction across the other.

A suspended system includes the rod 14 of non-magnetic material to the ends of which are clamped by nuts 16 a pair of coil forms 18 having flanges 20 extending through the air gaps and arranged to support the pick-up coils 22. All of these various parts are of non-magnetic material. In particular, the coil forms are formed of anodized, and therefore surface insulated, aluminum alloy. At the ends this assembly is resiliently mounted by means of a flat spring arrangement indicated at 24 in Figure 3. As illustrated in that figure an annular ring 26 is provided with fingers 30 which support a central portion 28 clamped to the moving assembly by nut 16. The clamping is effected between insulated washers 25 and 27. Upper and lower connecting lugs 29 and 31 are clamped between the coil forms and washers 27. The member 24 is preferably formed of a spring material such as beryllium copper in the form of a thin stamping to supply the necessary resiliency.

As will be evident, the entire structure is symmetrical about the central axis and consequently the introduction of any stray magnetic field causes substantially symmetrical changes in the whole system.

The coils 22 are so wound and connected that for a given relative movement of the parts of the device the electromotive forces induced in the coils are added, each of the coils, which are identical in number of turns and dimensions, thus contributing one half the useful electromotive force output. As will be evident, however, since the field is inwardly directed across one gap and outwardly across the other, the coils buck each other to the extent that they may be threaded by an externally arising stray magnetic field, i. e., assuming a vertical component of such a field threading upwardly through the apparatus, variations therein will produce bucking electromotive forces in the coils which balance out. The result accordingly is a detector which is substantially completely insensitive to such stray field while at the same time it has the required sensitivity to earth movements which occasion movements of the frame of the detector while the coils remain stationary.

The actual physical electrical connections through the coils are made from the terminal 38 through a flexible pigtail 40 to the lug 29 which is electrically connected to one end of the upper coil 22. The other end of this coil is connected through rod 14 to an end of lower coil 22 and the other end of the latter is connected by a flexible pigtail and a lead (not shown) threaded upward through the magnet assembly to the terminal 42. External connections are made from the terminals 38 and 42.

In addition to the foregoing, it will be noted that effective damping is provided by forming the coil forms 20 of aluminum or other non-magnetic metal so that their movements in the strong magnetic field will produce electromagnetic damping. Thus there may be avoided damping liquids with their attendant disadvantages.

It will be clear that numerous variations may be made in details of the apparatus without departing from the scope of the invention as defined in the following claims.

What I claim and desire to protect by Letters Patent is:

1. A seismic detector comprising means providing a rigid permanent magnet assembly having a pair of symmetrically arranged annular air gaps, a non-magnetic armature including a pair of coils and conductive elements mounting said coils located within said gaps, and spring means supporting said armature, said coils being astatically arranged so that stray magnetic fields cutting both coils induce therein bucking electromotive forces, while electromotive forces induced therein by relative movements of the coils and the magnet assembly are additive.

2. A seismic detector comprising means providing a rigid permanent magnet assembly having a pair of symmetrically arranged annular air gaps, a non-magnetic armature including a pair of coils and conductive elements mounting said coils located within said gaps, and flat spring means supporting said armature, said coils being astatically arranged so that stray magnetic fields cutting both coils induce therein bucking electromotive forces, while electromotive forces induced therein by relative movements of the coils and the magnet assembly are additive.

3. A seismic detector comprising a cylindrical permanent magnet, annular pole pieces associated therewith, a central core element within said permanent magnet, non-magnetic spacer rings engaging said core element and annular pole pieces to maintain them in concentric relationship, the central core element and said annular pole pieces providing a pair of symmetrically arranged annular air gaps, an armature including a pair of coils located within said gaps, and flat spring means supporting said armature, the armature extending through said central core element, said coils being astatically arranged so that stray magnetic fields induce therein bucking electromotive forces, while electromotive forces induced therein by relative movements of the coils and the magnet assembly are additive.

4. A seismic detector comprising a cylindrical permanent magnet, annular pole pieces associated therewith, a central core element within said permanent magnet, non-magnetic spacer rings engaging said core element and annular pole pieces to maintain them in concentric relationship, the central core element and said annular pole pieces providing a pair of symmetrically arranged annular air gaps, an armature including a pair of coils located within said gaps, and spring means supporting said armature, the armature extending through said central core element, said coils being astatically arranged so that stray magnetic fields induce therein bucking electromotive forces, while electromotive forces induced therein by relative movements of the coils and the magnet assembly are additive.

5. A seismic detector comprising a cylindrical permanent magnet, annular pole pieces associated therewith, a central core element within said permanent magnet, non-magnetic spacer rings engaging said core element and annular pole pieces to maintain them in concentric relationship, the central core element and said annular pole pieces providing a pair of symmetrically arranged annular air gaps, an armature including a pair of coils located within said gaps, and flat spring means supporting said armature, said coils being astatically arranged so that stray magnetic fields induce therein bucking electromotive forces, while electromotive forces induced therein by relative movements of the coils and the magnet assembly are additive.

6. A seismic detector comprising a cylindrical permanent magnet, annular pole pieces associated therewith, a central core element within said permanent magnet, non-magnetic spacer rings engaging said core element and annular pole pieces to maintain them in concentric relationship, the central core element and said annular pole pieces providing a pair of symmetrically arranged annular air gaps, an armature including a pair of coils located within said gaps, and spring means supporting said armature, said coils being astatically arranged so that stray magnetic fields induce therein bucking electromotive forces, while electromotive forces induced therein by relative movements of the coils and the magnet assembly are additive.

7. A seismic detector comprising a rigid cylindrical permanent magnet and pole pieces associated therewith to provide a pair of annular air gaps symmetrically arranged about a common axis, a non-magnetic armature including a pair of coils and conductive elements mounting said coils located within said air gaps, and spring means supporting said armatures, said coils being astatically arranged so that stray magnetic fields cutting both coils induce therein bucking electromotive forces, while electromotive forces induced therein by relative movements of the coils and the magnet assembly are additive.

8. A seismic detector comprising a rigid cylindrical permanent magnet and pole pieces associated therewith to provide a pair of annular air gaps symmetrically arranged about a common axis, a non-magnetic armature including a pair of coils and conductive elements mounting said coils located within said gaps, and flat spring means supporting said armature, said coils being astatically arranged so that stray magnetic fields cutting both coils induce therein bucking electromotive forces, while electromotive forces induced therein by relative movements of the coils and the magnet assembly are additive.

9. A seismic detector comprising means providing a rigid permanent magnet assembly having a pair of annular air gaps symmetrically arranged about a common axis, a non-magnetic armature including a pair of coils and conductive elements mounting said coils located within said air gaps and flat spring mounting means comprising a perforated metal disc having a center portion, supporting said armature, connected to an outer portion, mounted to said permanent magnet assembly, by arms of lengths greater than the radius of the disc, said coils being astatically arranged so that stray magnetic fields cutting both coils induce therein bucking electromotive forces, while electromotive forces induced therein by relative movements of the coils and the magnet assembly are additive.

ROBERT L. HENSON, Jr.

REFERENCES CITED

The following references are of record in the file of this patent:

UNITED STATES PATENTS

| Number | Name | Date |
|---|---|---|
| 1,906,066 | Holst et al. | Apr. 25, 1933 |
| 2,254,172 | Draper | Aug. 26, 1941 |
| 2,296,754 | Wolf et al. | Sept. 22, 1942 |